(12) United States Patent
Ahn

(10) Patent No.: US 6,172,839 B1
(45) Date of Patent: Jan. 9, 2001

(54) TECHNIQUE FOR MEASURING THE POSITION ERROR SIGNAL OF A DISK DRIVE

(75) Inventor: Young-Shun Ahn, Suwon (KR)

(73) Assignee: SamSung Electronics Co. Ltd., Suwon (KR)

( * ) Notice: Under 35 U.S.C. 154(b), the term of this patent shall be extended for 0 days.

(21) Appl. No.: 08/872,767

(22) Filed: Jun. 5, 1997

(30) Foreign Application Priority Data

Jun. 5, 1996 (KR) .................................................. 96-20051

(51) Int. Cl.[7] .................................................. G11B 5/596
(52) U.S. Cl. ...................... 360/77.08; 360/77.04
(58) Field of Search ........................ 360/72.1, 75, 77.01, 360/77.02, 77.04, 77.05, 77.07, 77.08, 78.04, 78.14

(56) References Cited

U.S. PATENT DOCUMENTS

| | | | |
|---|---|---|---|
| 5,170,299 | * 12/1992 | Moon | 360/77.08 |
| 5,210,662 | * 5/1993 | Nishijima | 360/77.02 |
| 5,241,433 | * 8/1993 | Anderson et al. | 360/77.04 |
| 5,381,281 | 1/1995 | Shrinkle et al. | 360/77.08 |
| 5,453,887 | 9/1995 | Negishi et al. | 360/77.08 |
| 5,574,602 | * 11/1996 | Baca et al. | 360/77.12 |
| 5,576,906 | 11/1996 | Fisher et al. | 360/77.08 |
| 5,576,910 | 11/1996 | Romano et al. | 360/77.08 |
| 5,602,692 | 2/1997 | Freitas et al. | 360/77.08 |
| 5,602,693 | 2/1997 | Brunnett et al. | 360/77.08 |
| 5,615,058 | 3/1997 | Chainer et al. | 360/51 |
| 5,760,990 | * 6/1998 | Ukani et al. | 360/77.08 |

FOREIGN PATENT DOCUMENTS

420693 * 4/1991 (EP) .

* cited by examiner

Primary Examiner—David L. Ometz
(74) Attorney, Agent, or Firm—Robert E. Bushnell, Esq.

(57) ABSTRACT

A technique for measuring a position error signal of a disk drive, includes measuring the width of a track by sequentially following two adjacent tracks upon turning on power, and updating a percentage of the position error signal according to the measurement of the track width.

7 Claims, 4 Drawing Sheets

TECHNIQUE FOR MEASURING THE POSITION ERROR SIGNAL OF A DISK DRIVE

CLAIM OF PRIORITY

This application makes reference to, incorporates the same herein, and claims all benefits accruing under 35 U.S.C. §119 from an application for METHOD OF MEASURING THE POSITION ERROR SIGNAL OF A DISK DRIVE earlier filed in the Korean Industrial Property Office on the 5$^{th}$ day of June 1996 and there duly assigned Ser. No. 20051/1996, a copy of which application is annexed hereto.

BACKGROUND OF THE INVENTION

1. Field of the Invention

The present invention concerns a disk drive, and more particularly to a technique for measuring the position error signal of a disk drive.

2. Description of the Related Art

Generally a position error signal (hereinafter referred to as a "PES") obtained by detecting a burst is valued by the resolution of an A-D converter, including the maximum and minimum values. Therefore, the percentages of PES are not determined by the width of the track, but are determined by an absolute value (constant) peculiar to the resolution of an A-D converter. Normally the width of the track may vary with the head margin, characteristics of the recording margin, servo write, etc., so that the correctness of the percentages of PES may not be secured if the width of the track varies with the apparatus, circuits or external environment.

The following patents each disclose features in common with the present invention but do not teach or suggest the specifically recited technique for measuring the position error signal of a disk drive in accordance with the present invention: U.S. Pat. No. 5,576,906 to Fisher et aL, entitled Synchronous Detection Of Concurrent Servo Bursts For Fine Head Position In Disk Drive, U.S. Pat. No. 5,576,910 to Romano et al., entitled Burst Comparison And Sequential Technique For Determining Servo Control In A Mass Storage Disk Device, U.S. Pat. No. 5,602,692 to Freitas et al., entitled Sampled Position Error Signal Demodulation System For Banded Data Disk Drives, U.S. Pat. No. 5,602,693 to Brunnett et al., entitled Method And Apparatus For Sensing Position In A Disk Drive, U.S. Pat. No. 5,615,058 to Chainer et aL, entitled Method And System For Writing A Servo-Pattern On A Storage Medium, U.S. Pat. No. 5,453,887 to Negishi et al., entitled Head Tracking Servo Pattern, and U.S. Pat. No. 5,381,281 to Shrinkle et al., entitled Disk Drive System Using Multiple Embedded Quadrature Servo Fields.

SUMMARY OF THE INVENTION

It is an object of the present invention to provide a technique for measuring a position error signal of a disk drive.

It is another object of the present invention to provide a technique for measuring the correct percentage of the position error signal of a disk drive by measuring the track width upon turning on power.

According to the present invention, a technique for measuring a position error signal of a disk drive, comprises measuring the width of a track by sequentially following two adjacent tracks upon turning on power, and updating a percentage of the position error signal according to the measurement of the track width.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
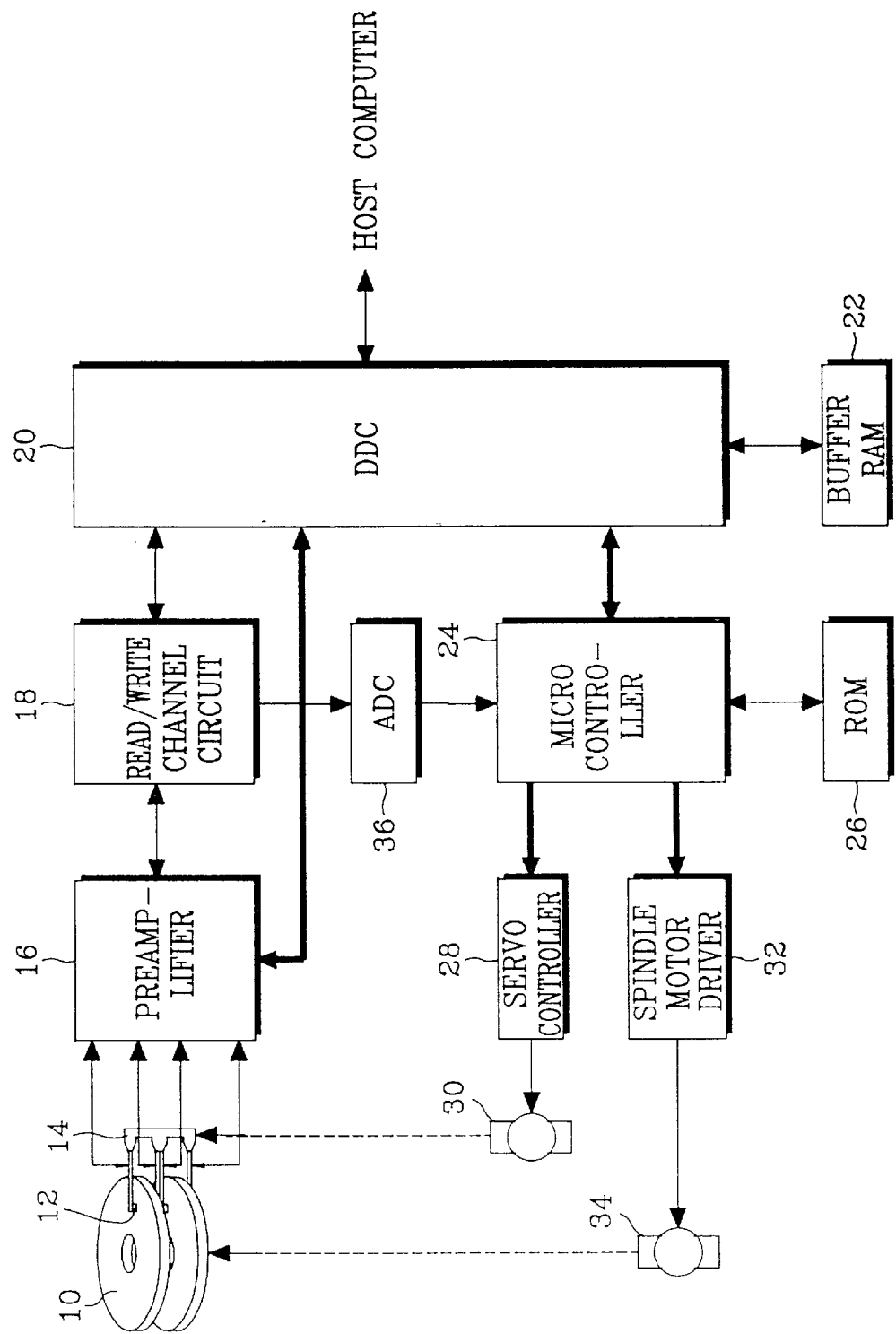
FIG. 1 is a block diagram of a hard disk drive according to the present invention.

Referring to FIG. 1, a plurality of disks 10 are rotated by a spindle motor 34. A plurality of heads 12 are respectively located on a plurality of disks and are installed on a plurality of support arms extended from a E-block assembly 14 assembled with a rotary voice coil actuator 30 to the disk. A pre-amplifier 16 supplies an analog read signal to a read/write channel circuit 18 by pre-amplifying a signal picked up by one of the heads 12 during reading, and lets a corresponding one of the heads 12 write on a disk by supplying coded write data output from the read/write channel circuit 18. The read/write channel circuit 18 detects and decodes a data pulse from a read signal output by the pre-amplifier 16 and supplies it to a disk data controller (hereinafter referred to as a 'DDC') 20, and supplies write data from the DDC 20 to the pre-amplifier 16 by decoding.

The DDC 20 writes data output from a host computer on a disk through the read/write channel circuit 18 and the pre-amplifier 16, and transmits data to the host computer by reading it from a disk. The DDC 20 interfaces a communication between the host computer and a microcontroller 24. A buffer RAM 22 temporarily stores data transmitted between the host computer, the microcontroller 24 and the read/write channel circuit 18. A microcontroller 24 controls a track detection and follow-up responding to an order of read or write received from the host computer. A ROM 26 stores a performance program of the microcontroller 24 and all sorts of command values. Servo driver 28 supplies a driving current to a voice coil of the actuator 30. The actuator 30 moves the head 12 on the disk 10 according to the level and direction of the driving current. A spindle motor driver 32 rotates the disk 10 according to a control value generated by the microcontroller 24. A disk signal controller 36 supplies a PES output from the read/write channel circuit 18 to the microcontroller 24 by converting it into a digital signal.

Figure 2:
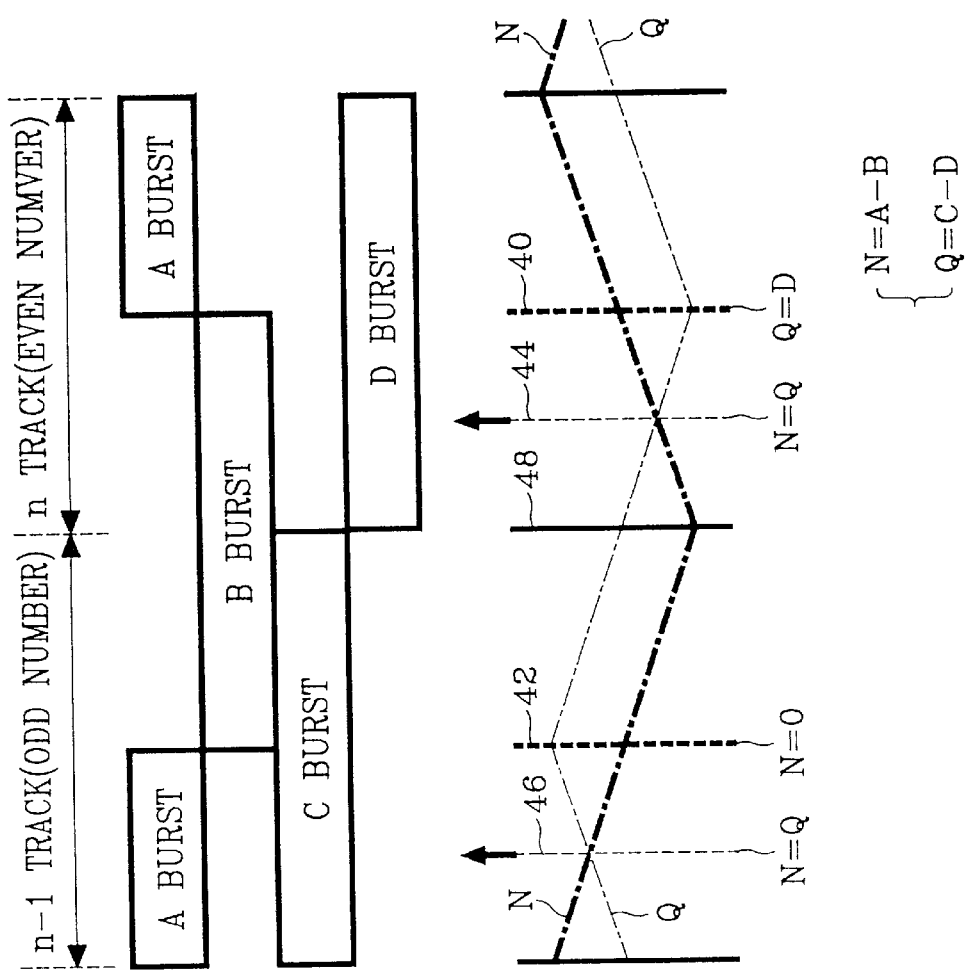
FIG. 2 is a graph for illustrating letters 'N' and 'Q' expressed by measuring a track width in measuring power-on operation.
Figure 3A:
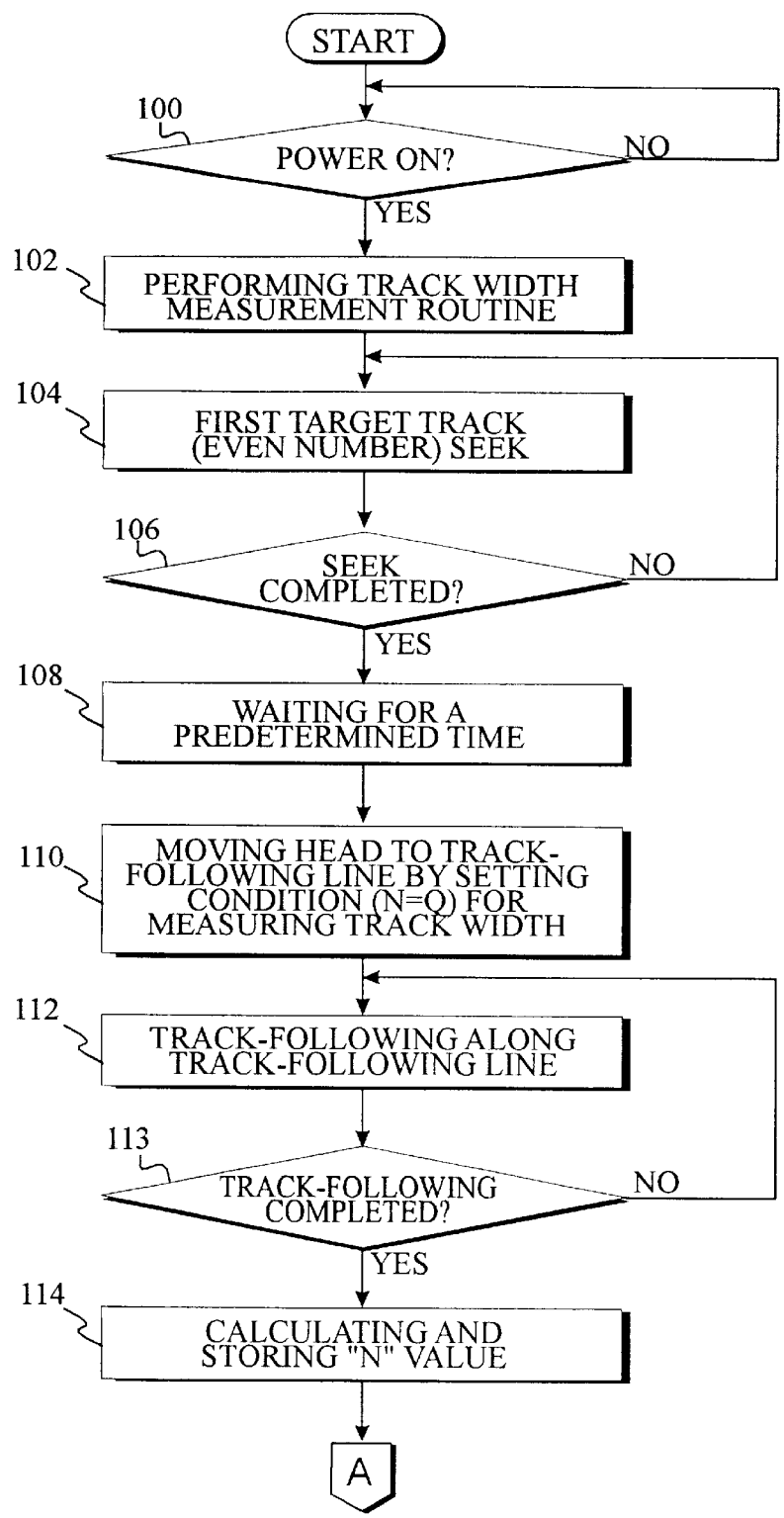
FIGS. 3A–3B together form a flowchart of control according to the present invention.
Figure 3B:
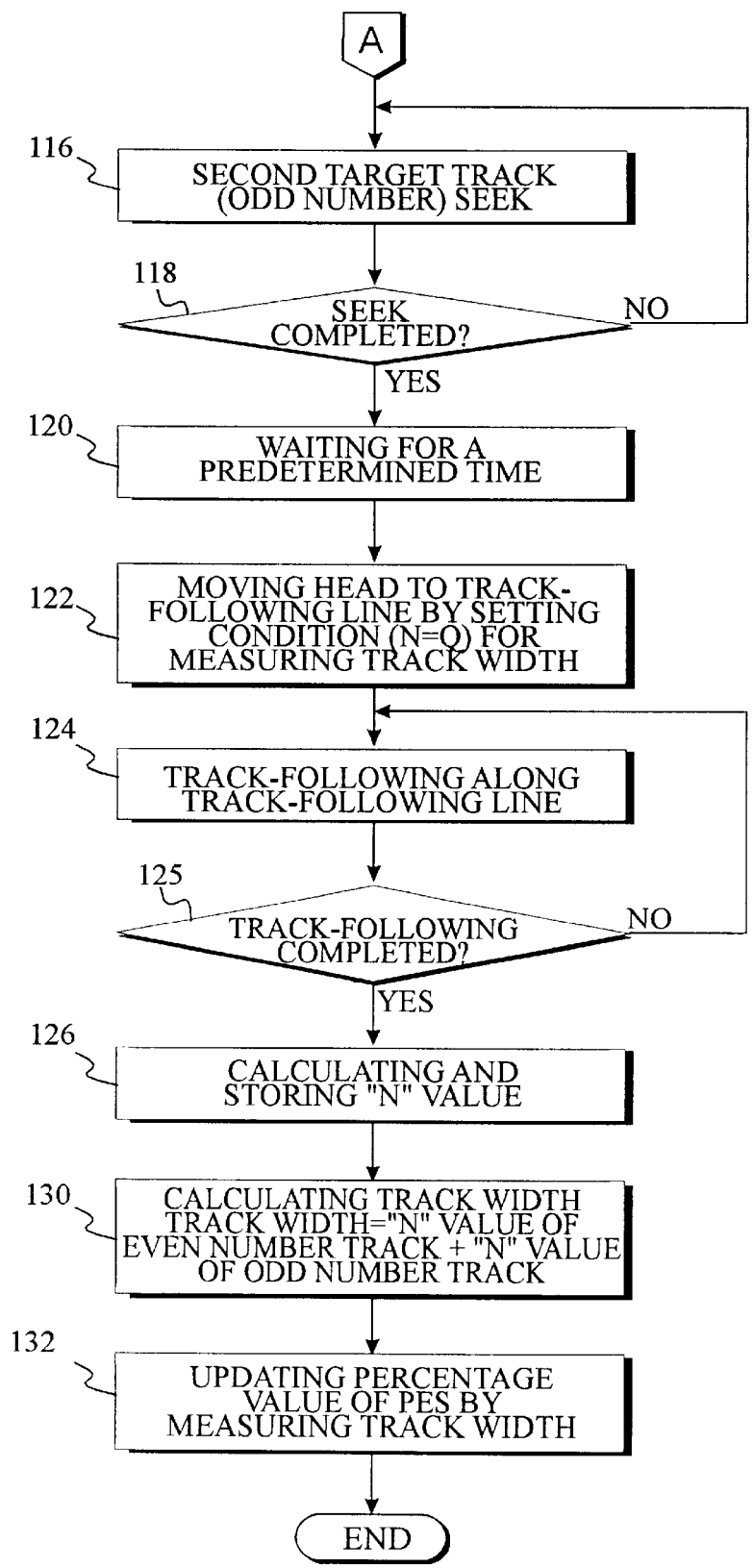

Referring to FIG. 2, in two adjacent tracks, an n-1 track (odd number) and an n track (even number), there exists an A burst, B burst, C burst and D burst for generating a PES. An A burst exists in the outside, being one half of each n-1 track and n track. A B burst exists in the inside, being one half of each n-1 track and n track. A C burst exists only in the n-1 track, and a D burst exists only in the n track. According to the present invention, FIG. 2 illustrates N and Q defined as follows:

N=A-B

Q=C-D wherein A, B, C and D represent burst signals.

FIG. 2 illustrates each value of the n-1 track and n track in each part of the n-1 track and n btrack. N equals 0 (zero)

in a center line 42 of the n−1 track and Q equals D in a center line 40 of the n track. Referring to FIGS. 1, 2 and 3A–3B, the microcontroller 24 checks to determine if there is a power on in step 100 and performs a track width measuring routine in step 102. Accordingly, the microcontroller 24 lets the head 12 seek a first track 'n' by servo-control in step 104 and thereafter confirms whether or not the seek has been completed by a servo signal read from the disk 10 in step 106. If the seek has been completed, the microcontroller 24 waits for a fixed time for securing an accuracy of track width measuring and detection stabilization in step 108. In step 110, the microcontroller 24 sets a condition for measuring a track width and controls the head to move according to the condition 'N=Q'.

Referring to FIG. 2, the head 12 remains near the center line 40 of the first track 'n' before step 110. The head 12 moves to the line 44 for track-following (hereinafter referred to as a 'track-following line') when a track width measuring condition is set at N=Q in step 110. The track-following line 44 is positioned in a center between a center line 40 of track n and a line 48 adjacent to track n−1 and parallel to each other. The track-following line 44 is positioned at the value of N=Q. The microcontroller 24 follows the 'n' track along the track-following line when the head 12 is positioned at the track-following line 44 in step 110 and confirms the completion of track-following in step 113. Upon completion of track-following, it calculates the 'n' value and stores it in step 114. When N is equal to A−B contours the track-following line 44, A is not detected and only half of the B value is detected. Accordingly, the N value is B/2. In step 116, the microcontroller 24 lets the head 12 seek a second track by servo-control. The operations from steps 118 to 126 are similar to that from steps 106 to 114. In steps 118 to 126, the N value is calculated by following a track-following line 46 of an n−1 track. When N is equal to A−B contours a track-following line 46, B is not detected and only half of the A value is detected. Accordingly, the N value is A/2.

After performing steps 106 to 114 and 118 to 126, the microcontroller 24 calculate a track width by adding the N value of track n to that of track n−1 in step 130. Accordingly, the track width equals A+B/2. Thereafter, the microcontroller 24 updates a percentage value of PES by measuring a track width in step 132. Accordingly the present invention measures a percentage value of PES by measuring a track width in measuring power-on operation, resulting in measuring a PES.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of measuring a position error signal of a disk drive, comprising the steps of:
   measuring a width of a track by sequentially following two adjacent tracks upon turning on power; and
   updating a percentage of said position error signal according to the measurement of the track width.

2. A method as defined in claim 1, the step of measuring the width of the track comprising the steps of:
   obtaining a first half value of the track width of a first of said two adjacent tracks by following said first track;
   obtaining a second half value of the track width of a second of said two adjacent tracks by following said second track; and
   adding said first and second half values to obtain the width of one track.

3. A method as defined in claim 2, the condition for measuring the track width being represented by an equation N=Q, where N=A−B and Q=C−D, and A, B, C and D are burst signals.

4. An apparatus for measuring a position error signal of a disk drive, comprising:
   a measuring means for measuring a width of a track by sequentially following two adjacent tracks upon turning on power; and
   a means for updating a percentage of said position error signal according to the measurement of the track width by said measuring means.

5. The apparatus as defined in claim 4, said measuring means for measuring the width of the track comprising:
   a means for obtaining a first half value of the track width of a first of said two adjacent tracks by following said first track;
   a means for obtaining a second half value of the track width of a second of said two adjacent tracks by following said second track; and
   an adder for adding said first and second half values to obtain the width of one track.

6. The apparatus as defined in claim 5, the condition for measuring the track width being represented by an equation N=Q, where N=A−B and Q=C−D, and A, B, C and D are burst signals.

7. A method of measuring a position error signal of a disk drive, comprising the steps of:
   determining whether or not power has been turned on;
   upon a determination that power has been turned on, performing a track width measurement routine and seeking a first track;
   determining whether or not the seeking of said first track has been completed;
   upon a determination that the seeking of said first track has been completed, waiting for a predetermined time and then moving a head to a track-following line by setting a condition N=Q, where N=A−B and Q=C−D and A, B, C, and D are burst signals, for measuring track width and then track-following along the track-following line of the first track;
   determining if track-following has been completed;
   upon a determination that track-following has been completed, calculating and storing a first N value;
   seeking a second track;
   determining if the seeking of said second track has been completed;
   upon a determination that the seeking of said second track has been completed, waiting for a predetermined time and then moving the head to a track-following line by setting a condition N=Q for measuring track width and then track-following along the track-following line of the second track;
   determining if the track-following has been completed;
   upon a determination that the track-following has been completed, calculating and storing a second N value; and
   calculating the track width which equals the first N value of the first track added to the second N value of the second track and then updating the percentage value of the position error signal by measuring track width.

* * * * *